United States Patent
Mendes Pereira Ribeiro

(10) Patent No.: US 10,969,879 B2
(45) Date of Patent: Apr. 6, 2021

(54) ELECTRONIC INTERACTIVE METHOD AND DEVICE FOR MAGNETIC OBJECTS

(71) Applicant: MAGIKBEE LDA, Braga (PT)

(72) Inventor: Hugo Filipe Mendes Pereira Ribeiro, Braga (PT)

(73) Assignee: MAGIKBEE LDA, Braga (PT)

( * ) Notice: Subject to any disclaimer, the term of this patent is extended or adjusted under 35 U.S.C. 154(b) by 0 days.

(21) Appl. No.: 15/999,454

(22) PCT Filed: Feb. 16, 2017

(86) PCT No.: PCT/IB2017/050884
§ 371 (c)(1),
(2) Date: Aug. 16, 2018

(87) PCT Pub. No.: WO2017/141189
PCT Pub. Date: Aug. 24, 2017

(65) Prior Publication Data
US 2019/0354202 A1   Nov. 21, 2019

(30) Foreign Application Priority Data
Feb. 16, 2016   (PT) .......................... 109161

(51) Int. Cl.
*G01N 27/02*   (2006.01)
*G06F 3/0354*   (2013.01)
(Continued)

(52) U.S. Cl.
CPC ........... *G06F 3/0354* (2013.01); *A63H 33/26* (2013.01); *G01C 17/28* (2013.01); *G06F 3/038* (2013.01)

(58) Field of Classification Search
CPC ..... G06F 3/038; G06F 3/046; B60R 11/0252; G01R 33/02
(Continued)

(56) References Cited

U.S. PATENT DOCUMENTS

| 2013/0050973 A1* | 2/2013 | Rohrbach | B60R 11/0252 |
| | | | 361/807 |
| 2016/0084781 A1* | 3/2016 | Lee | G06F 3/038 |
| | | | 324/655 |

(Continued)

OTHER PUBLICATIONS

International Search Report and Written Opinion for corresponding International PCT Application No. PCT/IB2017/050884, dated May 29, 2017.
Sungjae Hwang et al, "MagCubes", Human Factors in Computing Systems, ACM, 2 Penn Plaza, Suite 701 New York NY 10121-0701 USA, Apr. 18, 2015 p. 163.

(Continued)

*Primary Examiner* — Abdul-Samad A Adediran
(74) *Attorney, Agent, or Firm* — Leason Ellis LLP

(57) ABSTRACT

The present disclosure relates to a method for operating an electronic device having a display and compass sensor, for interacting with a set of objects, each of the objects incorporating a magnet, said method comprising: obtaining an initial reading of the compass sensor signal; obtaining a current reading of the compass sensor signal until the compass sensor signal stabilizes; deducting from the obtained current reading of the compass sensor signal the initial reading of the compass sensor signal; comparing if the deducted compass sensor signal matches a predetermined compass sensor signal corresponding to the compass sensor signal obtained from the combination of 2 or more of said objects in a specific spatial arrangement relative to the electronic device, each object having incorporated a magnet in a specific position and in a specific orientation.

9 Claims, 10 Drawing Sheets

(51) Int. Cl.
*A63H 33/26* (2006.01)
*G01C 17/28* (2006.01)
*G06F 3/038* (2013.01)

(58) Field of Classification Search
USPC .......................................... 324/655; 361/807
See application file for complete search history.

(56) References Cited

U.S. PATENT DOCUMENTS

2016/0299606 A1* 10/2016 Go ........................ G06F 3/046
2018/0356472 A1* 12/2018 Garofalo ................ G01R 33/02

OTHER PUBLICATIONS

Sungjae Hwang et al, "MagGetz", Proceedings of the 26th Annual ACM Symposium on User Interface Software and Technology, UIST '13, New York, New York, USA, pp. 411-416, Jan. 1, 2013.
MagikBee, "Magik Play IndieGoGo Campaign", (Dec. 16, 2015), p. 1, URL: https://www.youtube.com/watch?v=uM4MH_-CrCs, retrieved May 15, 2017.
Andrea Bianchi et al, "MagnID", Tangible, Embedded, and Embodied Interaction, ACM, 2 Penn Plaza, Suite 701 New York NY 10121-0701 USA, Jan. 15, 2015, pp. 61 68.
Bianchi, A. et al., Designing Tangible Magnetic Appcessories, TEI 2013, Feb. 10-13, 2013, Barcelona, Spain. Copyright 2013 ACM, p. 1-4.

* cited by examiner

ELECTRONIC INTERACTIVE METHOD AND DEVICE FOR MAGNETIC OBJECTS

CROSS-REFERENCE TO RELATED APPLICATIONS

This application is a U.S. National Stage Application under 35 U.S.C. § 371 of International Patent Application No. PCT/IB2017/050884, filed Feb. 16, 2017, which claims priority to Portugal Application No. 109161, filed Feb. 16, 2016, which are hereby incorporated by reference in their respective entireties.

TECHNICAL FIELD

The present disclosure relates to a method and an electronic device for interacting with a set of objects incorporating a magnetic material providing presence, position and orientation feedback to said electronic device having a display and a compass sensor, such as tablet or a smartphone.

BACKGROUND

The document "Designing Tangible Magnetic Appcessories" in ACM 978-1-4503-1898-3/13/02, by Bianchi and Oakley, describes identifying an object placed on a tablet screen from the intensity of the magnetic field of a magnet embedded in said object, using the magnetic compass of the tablet, and also determining the orientation of said object by detecting the direction of the magnetic field of said magnet. The document by Bianchi also describes differentiating between different fixed locations and four cardinal directions by using a template matching approach when two magnets are placed in the same object. The document by Bianchi, however, does not describe any possibility of detecting, even if partially within some predetermined constraints, the location and direction of multiple objects present at the same time. In particular, the document of Bianchi requires two magnets in each object for detecting, even if partially within some predetermined constraints, the location and direction of each object.

These facts are disclosed in order to illustrate the technical problem addressed by the present disclosure.

General Description

The present disclosure relates to a method and an electronic device for interacting with a set of objects incorporating a magnetic material—or magnet—providing presence, position and orientation feedback to said electronic device having a display and a compass sensor, such as tablet or smartphone.

The disclosure includes a method by which specific software running on the device reads the values from the compass sensor and detects the combination of the objects placed with a particular spatial arrangement. The software running on the device can trigger text, images, animations, interactive elements, sound effects, or in general any digital content, in response to the nearby presence of a particular combination of objects.

A compass sensor—or 3-axis magnetometer—can be embodied by an orthogonal 3-axis magnetometer or 3 orthogonal 1-axis magnetometers.

The objects can be for instance construction blocks, commonly found on children toys, action figures, numbers, letters as an example. The present disclosure can be applied to a number of children toys enabling such objects to trigger digital content on a digital device with 3-axis magnetometer sensor.

The magnetic material is joined with the objects with each of the objects having a varying magnetic direction and intensity, in such manner so that a combination of objects with a particular spatial arrangement has a predetermined magnetic intensity and direction.

In the context of the present disclosure, magnetic direction should be understood as including polarisation. That is, the same magnet, but rotated 180°, has a different (the inverse) magnetic field direction.

The particular spatial arrangements are predetermined dependent on the application goal. For instance in a puzzle, the spatial arrangement of interest would be for the objects placed in their correct locations in respect of the completed puzzle.

Preferably, a number of spatial arrangements of the objects is predetermined and the magnetic direction and intensity of each of the objects present in said spatial arrangements is predefined such that each of the spatial arrangements provides the magnetic compass of the electronic device with a unique magnetic intensity and direction. This way, simply by verifying the intensity and direction of the magnetic compass, the device is able to ascertain which of the spatial arrangements is present. This is useful for example for puzzles that are completed sequentially where feedback can be given for correct steps along the completion of the puzzle.

The software running on the electronic device reads the intensity of each of the 3-axis magnetic sensor to determine the magnetic direction and intensity on the device sensor.

The software matches the magnetic direction and intensity determined from the electronic device sensor to a list of predetermined stored values for each object configuration, to identify the correct set of objects.

When the software detects a variation on the magnetic field, it iterates through a list of known values for each object or objects configuration in order to match the current readings with a saved value, therefore identifying the correct set of objects.

It is disclosed a method for operating an electronic device having a display and compass sensor, for interacting with a set of objects, each of the objects incorporating a magnet, said method comprising:
  obtaining an initial reading of the compass sensor signal;
  obtaining a current reading of the compass sensor signal until the compass sensor signal stabilizes;
  deducting from the obtained current reading of the compass sensor signal the initial reading of the compass sensor signal;
  comparing if the deducted compass sensor signal matches a predetermined compass sensor signal corresponding to the compass sensor signal obtained from the combination of 2 or more of said objects in a specific spatial arrangement relative to the electronic device, each object having incorporated a magnet in a specific position and in a specific orientation.

It has been found that for many of the commercially available tablets, when the magnetic field of two or more objects incorporating a magnet are measured, the field values are non-linear. That is, the magnetic value, as measured by the tablet compass, of each object taken separately is not substantially equivalent to the magnetic value of the two objects taken together.

Thus, it is a feature of the overall disclosure, to distinguish the presence of two or more objects in combination from said objects in isolation, when said objects are capable of introducing non-linear magnetic measurements by the compass sensor of the electronic device.

This method has namely advantages in being able to differentiate between combinations of objects, in particular 3 or more, placed in the vicinity of the electronic device, and respective spatial arrangement including position and direction.

It has been also found that for three or more objects, placed in the vicinity of the electronic device, theses non-linearities are even more evident.

An embodiment comprises repeating the steps of said method:
  obtaining a current reading of the compass sensor signal until the compass sensor signal stabilizes;
  deducting from the obtained current reading of the compass sensor signal the initial reading of the compass sensor signal;
  comparing if the deducted compass sensor signal matches a predetermined compass sensor signal corresponding to the compass sensor signal obtained from the combination of 2 or more of said objects in a specific spatial arrangement relative to the electronic device, each object having incorporated a magnet in a specific position and in a specific orientation;
  until said match is obtained.

By repeating the measurements, the device is able to interactively respond to a user of the device as the user places said objects.

An embodiment comprises:
  comparing if the deducted compass sensor signal matches one of a plurality of different predetermined compass sensor signals,
  each said different predetermined compass sensor signal corresponding to the compass sensor signal obtained from a different combination of 2 or more of said objects in a specific spatial arrangement relative to the electronic device, each object having incorporated a magnet in a specific position and in a specific orientation.

By comparing the measurements against a plurality of previously measured different combinations of objects, the device is able to interactively respond to a user of the device as the user places said objects in one of multiple arrangements. This is relevant because any of such combination can trigger a reaction, possibly different reactions according to the object combination, by the device.

An embodiment comprises:
  comparing if the deducted compass sensor signal matches one of a plurality of different predetermined compass sensor signals in a predetermined sequence,
  each said different predetermined compass sensor signal corresponding to the compass sensor signal obtained from a different combination of 2 or more of said objects in a specific spatial arrangement relative to the electronic device,
  each object having incorporated a magnet in a specific position and in a specific orientation.

By comparing the measurements, against a plurality of previously measured different combinations of objects, but in a predetermined sequence, the device is able to interactively respond to a user of the device as the user places said objects in one of multiple arrangements in a specific sequence. This is relevant the device may trigger a reaction, only if a specific sequence of object combinations is detected.

In an embodiment,
  the magnet of each object is in a specific position and in a specific orientation relative to the respective object, such that
  each said predetermined compass sensor signal, corresponding to the compass sensor signal obtained from each object or from a different combination of 2 or more of said objects in one specific spatial arrangement relative to the electronic device,
  is different from the other predetermined compass sensor signals.

It is relevant the position and orientation of each magnet relative to the respective object enables the disclosed measurements such that the device can tell apart the different combinations.

In an embodiment, any such spatial arrangement relative to the electronic device of said objects is such that each object is resting on or against the display of said electronic device.

It has been found that as objects are placed closer to the device, in particular when resting on or against the display of said electronic device, said objects are much more likely to introduce non-linear magnetic measurements by the compass sensor of the electronic device.

Thus, it is a feature of the overall disclosure, to distinguish the presence of two or more objects in combination from said objects in isolation, when resting on or against the display of said electronic device, when said objects are capable of introducing non-linear magnetic measurements by the compass sensor of the electronic device.

In an embodiment, when any such match is obtained, it comprises triggering an action comprising emitting a sound or displaying an image, animation, or film.

In an embodiment, said method is only initiated after detecting an initial action by a user of the electronic device, in particular a key press or a touch on the display.

It is also disclosed a non-transitory storage media including program instructions for implementing a method for operating an electronic device having a display and compass sensor, for interacting with a set of objects, the program instructions including instructions executable to carry out the method of any of the claims 1-8.

It is also disclosed a set of 3 or more objects for interacting with an electronic device having a display and compass sensor, each of the objects incorporating a magnet, wherein
  the magnet of each object is in a specific position and in a specific orientation relative to the respective object, such that
  each said predetermined compass sensor signal,
  corresponding to the compass sensor signal obtained from a different combination of 2 or more of said objects in one specific spatial arrangement from a plurality of predetermined object combinations and spatial arrangements,
  is different from the other predetermined compass sensor signals.

In an embodiment, each said object has at least one flat face for laying on or against the display of said electronic device It is also disclosed an electronic device having a display and compass sensor, a set of objects according to any of the described and a non-transitory storage media according to any of the described.

In an embodiment, the compass sensor is an 3-axis magnetometer, in particular said axes being orthogonal.

In an embodiment, the compass sensor is a set of three 1-axis magnetometers, in particular said axes being orthogonal.

It is also disclosed a tablet stand for holding a tablet at an angle from the horizontal, comprising a shelf suitable for supporting one or more objects resting against the display.

In an embodiment, the tablet stand is also for holding a tablet at an angle from the vertical.

BRIEF DESCRIPTION OF THE DRAWINGS

The following figures provide preferred embodiments for illustrating the description and should not be seen as limiting the scope of invention.

DETAILED DESCRIPTION

Figure 1:
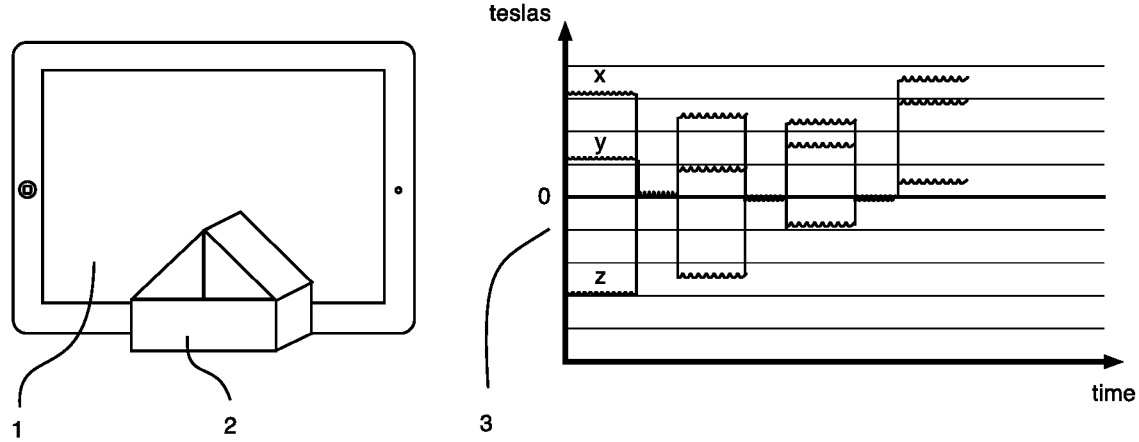
FIG. 1: Schematic representation of an embodiment where the following are represented:
  1—electronic device with a 3-axis magnetometer sensor,
  2—physical objects placed near, or on, the device, having an embedded magnet,
  3—x,y,z axis magnetometer signal as processed by the software running on the device.

FIG. 1 shows a schematic representation of an embodiment where the following are represented: an electronic device 1 with a 3-axis magnetometer sensor, physical objects 2 placed near, or on, the device, having an embedded magnet, and a 3-axis magnetometer signal 3 as processed by the software running on the device.

FIG. 2 shows a schematic representation of an embodiment of a method of operating one disclosed electronic device and magnetic objects, where the following are represented: the press of a start button 4, wherein the initial magnetic field corresponds to the environmental magnetic field; the placement of a particular spatial arrangement of objects each having enclosed a magnet, generating a combined magnetic field 5 with a specific intensity and direction; recognition of a particular spatial arrangement of objects by the detection of the specific intensity and direction of the combined magnetic field 6.

FIG. 3 shows a schematic representation of an embodiment where the following are represented: press of start button 7, wherein the initial magnetic field corresponds to the environmental magnetic field; placement of a first object (for example, a rectangular prism) with an enclosed magnetic material, generating a first magnetic field 8 with a specific intensity and direction; recognition of the first object, by the detection of the specific intensity and direction of the first magnetic field 9; placement of a second object (for example, a triangular prism) with an enclosed magnetic material, generating a second magnetic field 10 with a specific intensity and direction which is different from the first magnetic field; recognition of the second object, by the detection of the specific intensity and direction of the first magnetic field 11.

Figure 4:
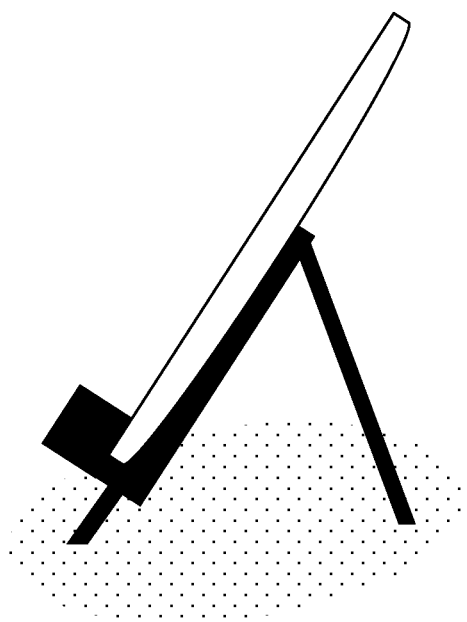
FIG. 4: Schematic representation of a tablet stand for holding a tablet at an angle from the horizontal, and at an angle from the vertical, comprising a shelf.

FIG. 4 shows a schematic representation of a tablet stand for holding a tablet at an angle from the horizontal, and at an angle from the vertical, comprising a shelf.

Figure 5:
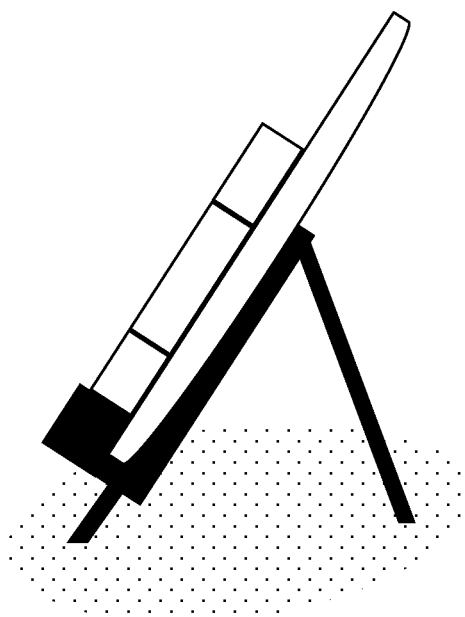
FIG. 5: Schematic representation of a tablet stand for holding a tablet at an angle from the horizontal, and at an angle from the vertical, comprising a shelf supporting one or more objects resting against the display, each of said objects having an embedded magnet.

FIG. 5 shows a schematic representation of a tablet stand for holding a tablet at an angle from the horizontal, and at an angle from the vertical, comprising a shelf supporting one or more objects resting against the display, each of said objects having an embedded magnet.

Figure 6:
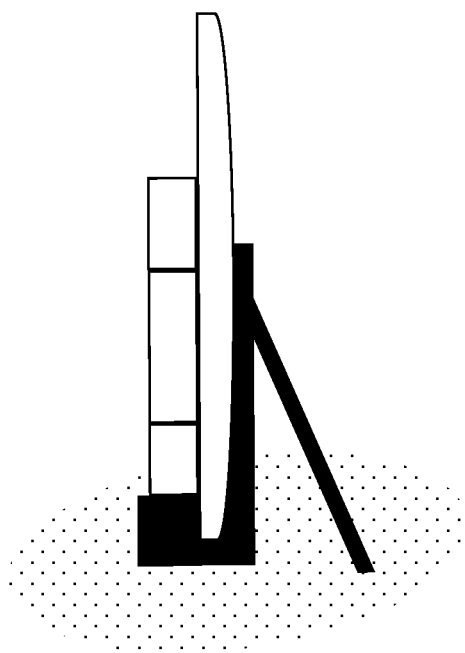
FIG. 6: Schematic representation of a tablet stand for holding a tablet vertically, comprising a shelf supporting one or more objects resting against the display, each of said objects having an embedded magnet.

FIG. 6 shows a schematic representation of a tablet stand for holding a tablet vertically, comprising a shelf supporting one or more objects resting against the display, each of said objects having an embedded magnet.

Figure 7:
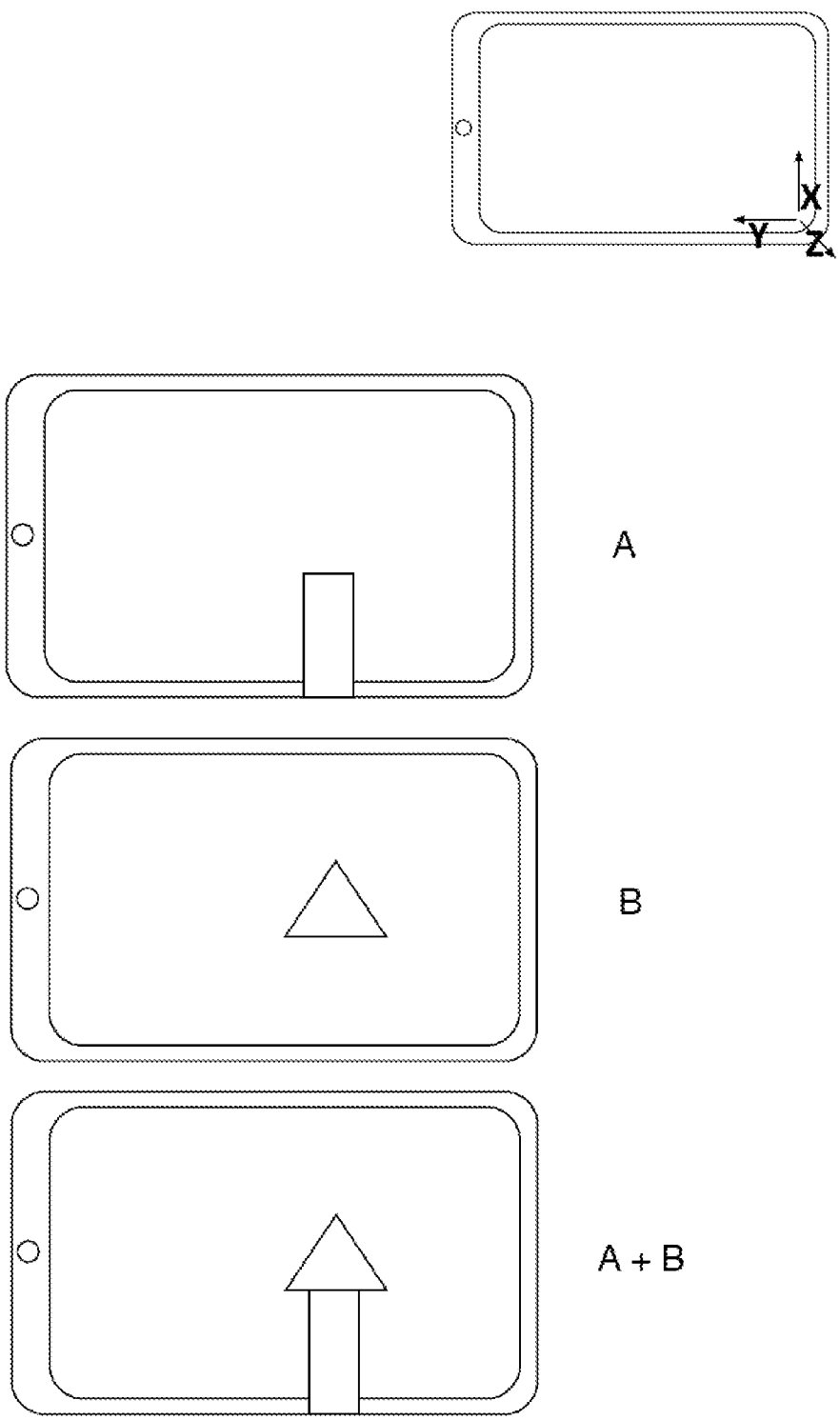
FIG. 7: Schematic representation (top view) of a tablet wherein objects are combined wherein the magnetic readings are A: x=−21 µT $\sigma_x$=0.47, y=−80 µT $\sigma_y$=1.0, z=−48 µT $\sigma_z$=0.93; B: x=−20 µT $\sigma_x$=0.97, y=−38 µT $\sigma_y$=0.93; z=15 µT $\sigma_z$=1.1; A+B: x=−42 µT $\sigma_x$=0.8, y=−117 µT $\sigma_y$=0.85, z=−35 µT $\sigma_z$=0.94. These values correspond to 10 samples/measurement and show linearly combined results.

FIG. 7 shows a schematic representation of a tablet (top view) of an embodiment wherein several objects were sequentially placed on top of the tablet along a vertical axis (Y) where the magnetic readings add linearly. This and the following measurements were taken with an iPad 4™ (model a1458).

Figure 8A:
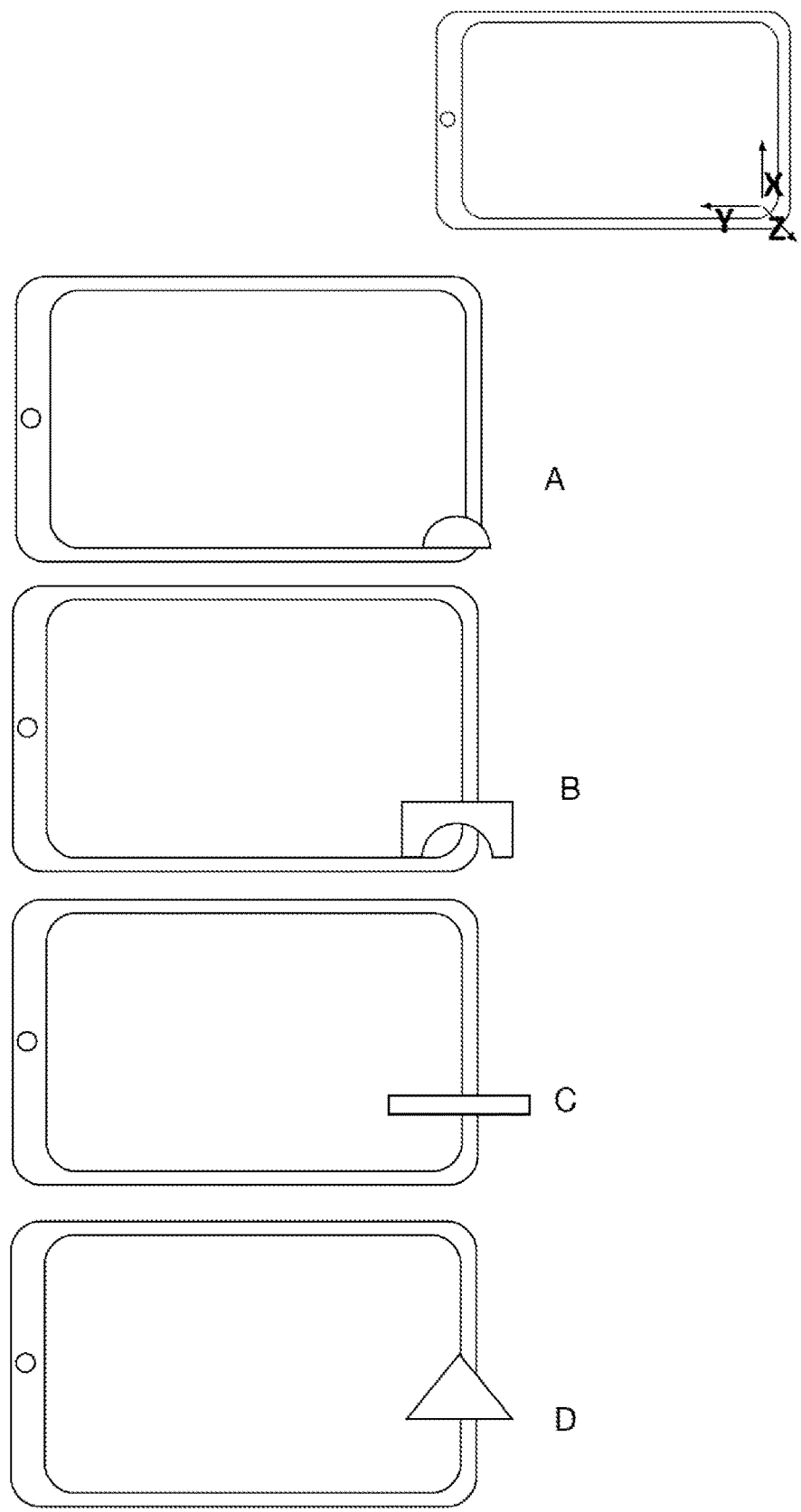
FIG. 8a: Schematic representation (top view) of a tablet wherein objects are combined and the magnetic readings are A: x=88 µT $\sigma_x$=0.62, y=30 µT $\sigma_y$=1.00, z=−617 µT $\sigma_z$=1.30; B: x=1415 µT $\sigma_x$=0.00, y=119 µT $\sigma_y$=0.57; z=−1115 µT $\sigma_z$=0.58; C: x=1253 µT $\sigma_x$=0.00, y=376 µT $\sigma_y$=0.66, z=−1416 µT $\sigma_z$=0.00; D: x=−375 µT $\sigma_x$=0.61, y=−136 µT $\sigma_y$=1.01; z=749 µT $\sigma_z$=1.18.
Figure 8B:
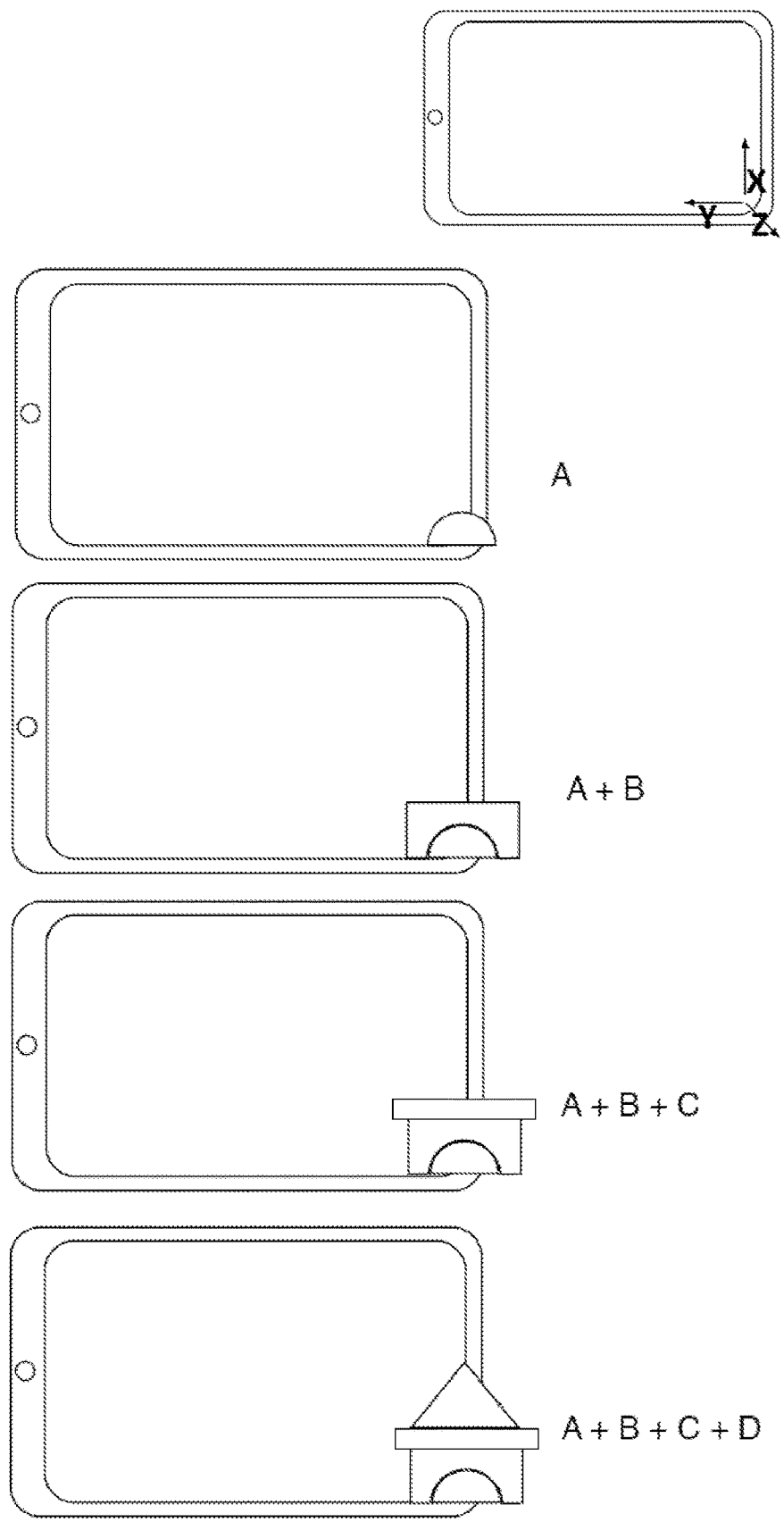
FIG. 8b: Schematic representation (top view) of a tablet wherein objects are combined and the magnetic readings are A: x=88 µT $\sigma_x$=0.62, y=30 µT $\sigma_y$=1.00, z=−617 µT $\sigma_z$=1.30; A+B: x=1415 µT $\sigma_x$=0.00, y=255 µT $\sigma_y$=0.38; z=−1386 µT $\sigma_z$=0.60; A+B+C: x=1415 µT $\sigma_x$=0.00, y=519 µT $\sigma_y$=0.73, z=−1416 µT $\sigma_z$=0.00; A+B+C+D: x=1415 µT $\sigma_x$=0.00, y=512 µT $\sigma_y$=0.49; z=−1147 µT $\sigma_z$=0.61. These values correspond to 10 samples/measurement and show non-linearly combined results.

FIG. 8 a/b shows a schematic representation of a tablet (top view) of an embodiment wherein several objects were sequentially placed on top of the tablet along a vertical axis (Y) where the magnetic readings add non-linearly. This is clear from the results of A+B which differ from A and B taken separately and subsequently added. This is also clear from the results of A+B+C which differ from A, B and C taken separately and subsequently added, which also differ from the results of A+B and C taken separately and subsequently added. This is also clear from the results of A+B+C+D which differ from A, B, C and D taken separately and subsequently added, which also differ from the results of A+B and C and D taken separately and subsequently added, which also differ from the results of A+B+C and D taken separately and subsequently added.

Figure 9:
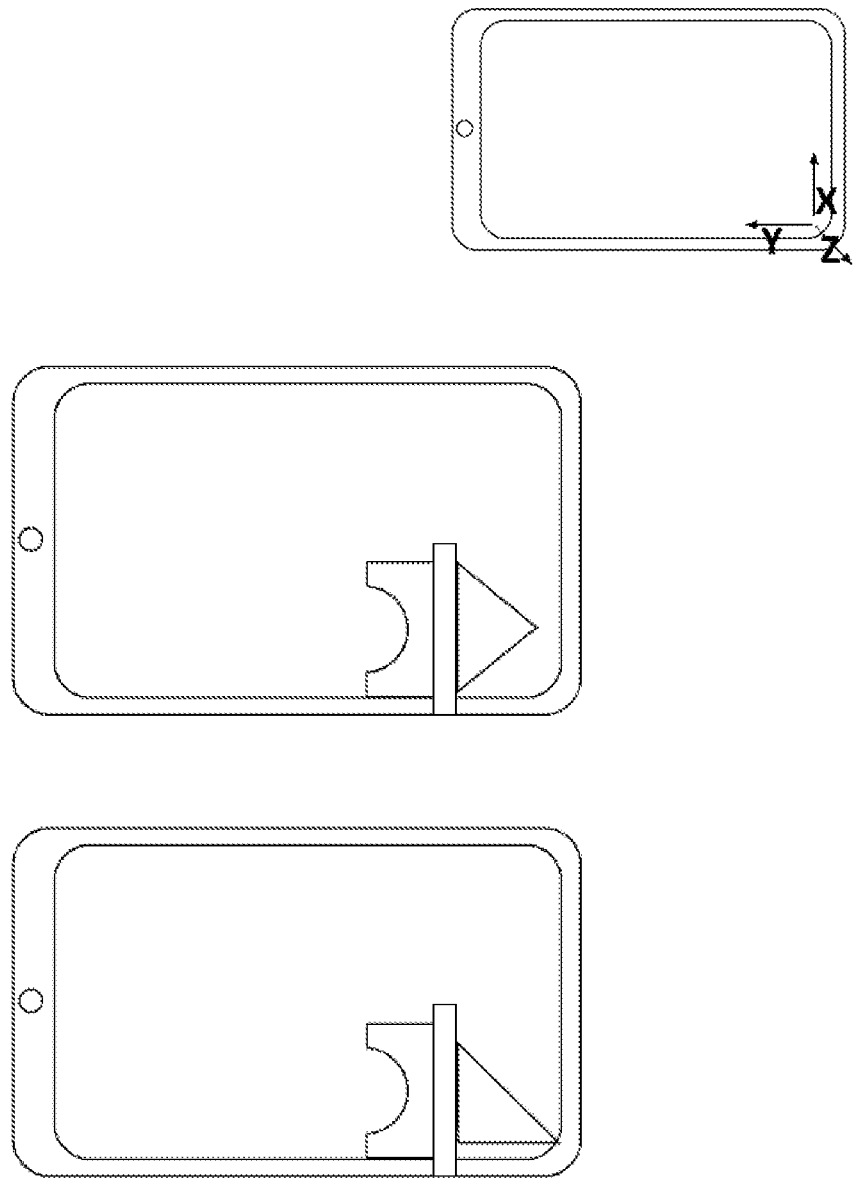
FIG. 9: Schematic representation (top view) of a tablet wherein objects are positioned similarly and the magnetic readings obtained are markedly different: x=−47 µT $\sigma_x$=0.95, y=507 µT $\sigma_y$=0.51, z=−332 µT $\sigma_z$=0.80; x=−97 µT $\sigma_x$=0.80, y=−114 µT $\sigma_y$=0.70; z=652 µT $\sigma_z$=1.1. These values correspond to 10 samples/measurement.

FIG. 9 shows a schematic representation of a tablet (top view) of an embodiment wherein several objects were positioned similarly but the magnetic readings obtained are markedly different. In an embodiment, for the identification of a particular spatial arrangement of objects placed near the device, the method comprises a sequence of steps.

Figure 2A:
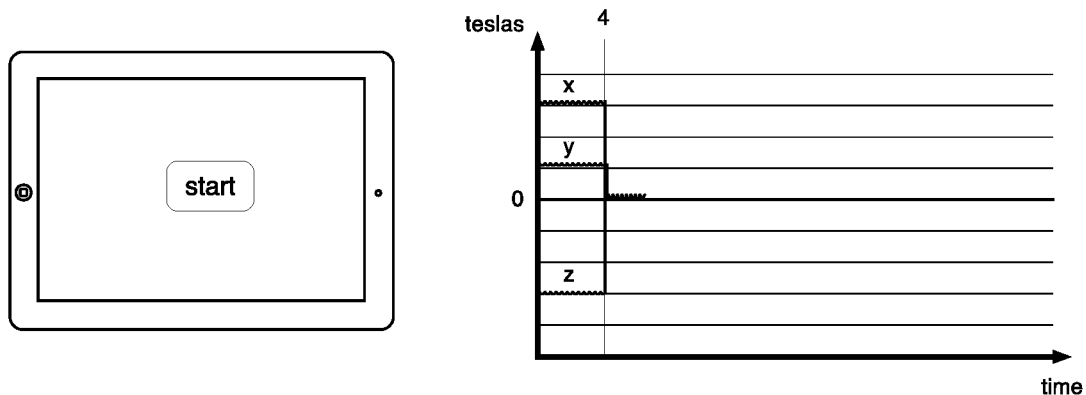
FIG. 2: Schematic representation of an embodiment of a method of operating one disclosed electronic device and magnetic objects, where the following are represented:
  4—press of start button, wherein the initial magnetic field corresponds to the environmental magnetic field,
  5—placement of a particular spatial arrangement of objects each having enclosed a magnet, generating a combined magnetic field with a specific intensity and direction,
  6—recognition of a particular spatial arrangement of objects by the detection of the specific intensity and direction of the combined magnetic field.

When starting the application the software reads the current 3-axis magnetometer signal and subsequently subtracts that reading (base reading) from the signal, resulting in a zero signal for each axis (FIG. 2a). This step compensates for geomagnetic influence and other external magnetic interferences.

Figure 2B:
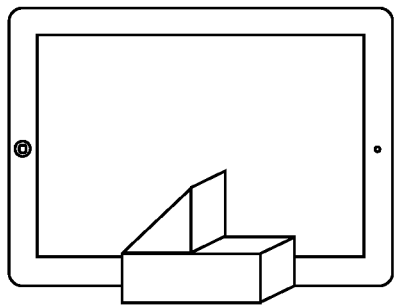
Figure 2B:
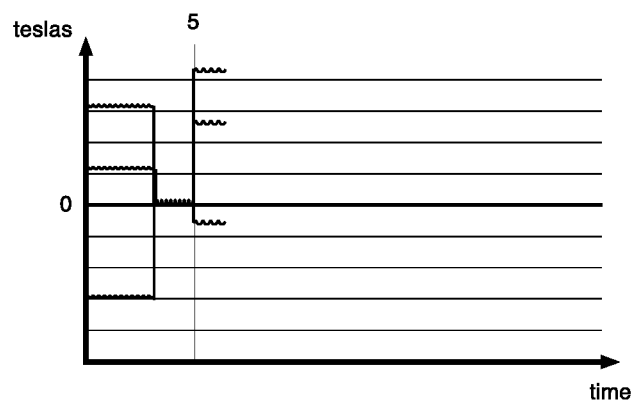

A set of objects with an enclosed magnetic material is placed in a predetermined location near the device. The magnetometer signal for each axis changes due to the magnetic intensity and direction of the objects combination (FIG. 2b).

Figure 2C:
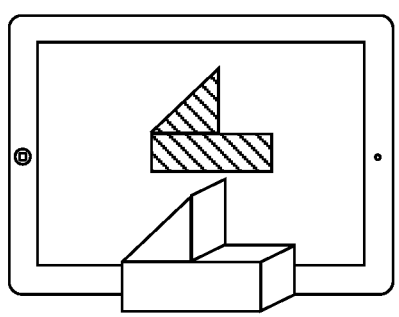
Figure 2C:
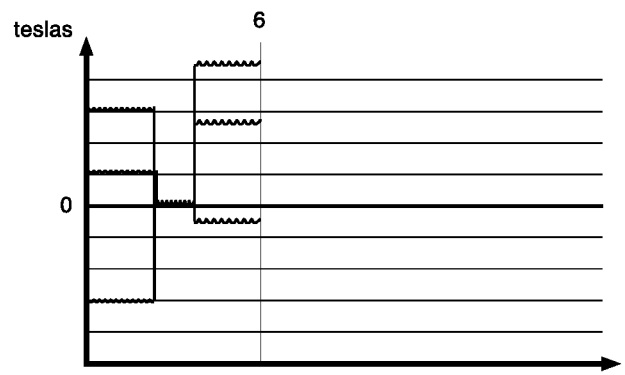

When the 3-axis magnetometer signal stabilizes for a given amount of time, the software compares the magnetometer x, y, z signal against a stored table with predetermined values. The software recognizes the particular spatial arrangement of objects if the signal is close enough to one of the stored table values (FIG. 2c).

In an alternative embodiment, the recognition of a particular spatial arrangement of objects is performed identifying each object sequentially as it is placed in a predetermined location.

Figure 3A:
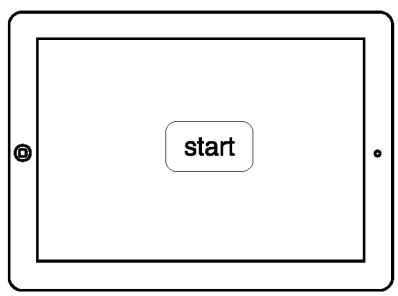
FIG. 3: Schematic representation of an embodiment where the following are represented:
  7—press of start button, wherein the initial magnetic field corresponds to the environmental magnetic field,
  8—placement of a first object (for example, a rectangular prism) with an enclosed magnetic material, generating a first magnetic field with a specific intensity and direction,
  9—recognition of the first object, by the detection of the specific intensity and direction of the first magnetic field,
  10—placement of a second object (for example, a triangular prism) with an enclosed magnetic material, generating a second magnetic field with a specific intensity and direction which is different from the first magnetic field,
  11—recognition of the second object, by the detection of the specific intensity and direction of the first magnetic field.
Figure 3A:
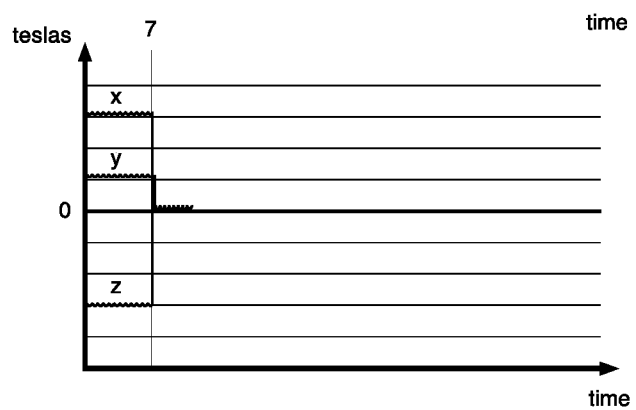

When starting the application the software reads the current 3-axis magnetometer signal and subsequently subtracts that reading (base reading) from the signal, resulting in a zero signal for each axis (FIG. 3a). This step compensates for geomagnetic influence and other external magnetic interferences.

Figure 3B:
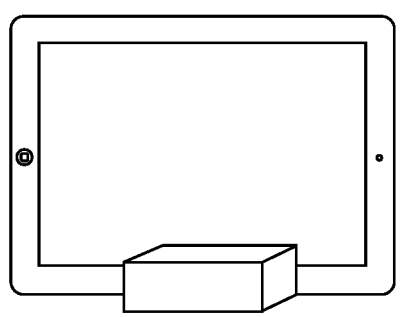
Figure 3B:
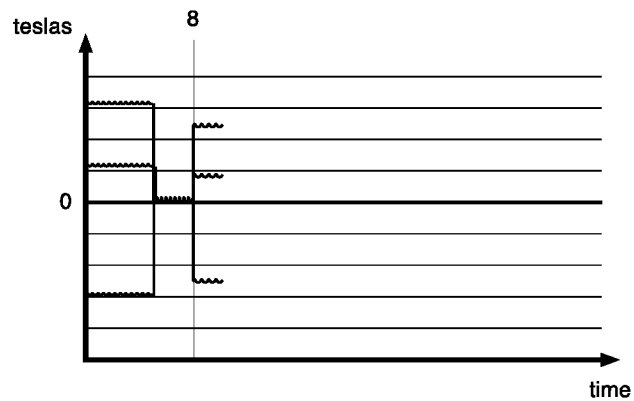

An object with an enclosed magnetic material is placed in a pre-determined location near the device. The magnetometer signal for each axis changes due to the magnetic intensity and direction of the object (FIG. 3b).

Figure 3C:
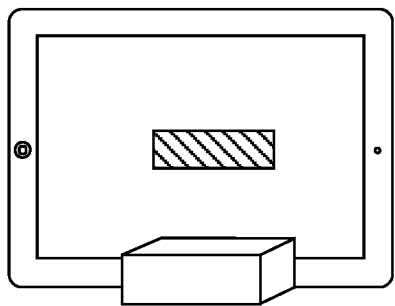
Figure 3C:
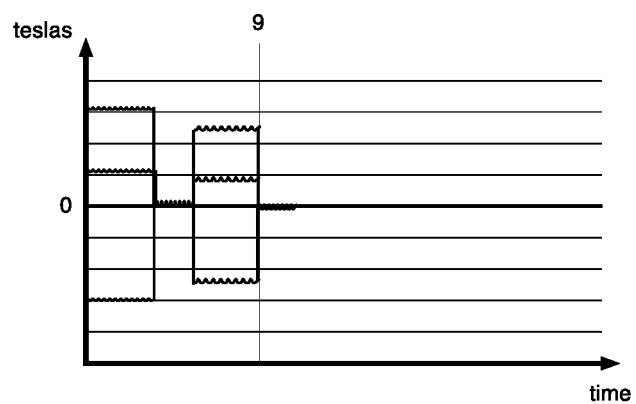

When the 3-axis magnetometer signal stabilizes for a given amount of time, the software compares the magnetometer x, y, z signal against a stored table with predetermined values. The software recognizes the object if the signal is close enough to one of the stored table values (FIG. 3c). Current magnetometer readings are stored. Subsequent magnetometer readings are subtracted from the stored magnetometer readings, resulting in a zero x,y,z signal.

Figure 3D:
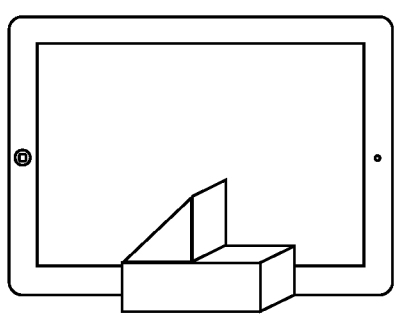
Figure 3D:
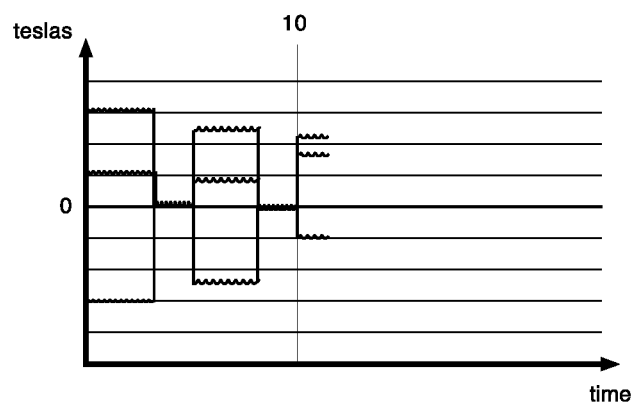

A new object with an enclosed magnetic material is placed in another pre-determined location near the device. The magnetic field and intensity changes (FIG. 3d).

Figure 3E:
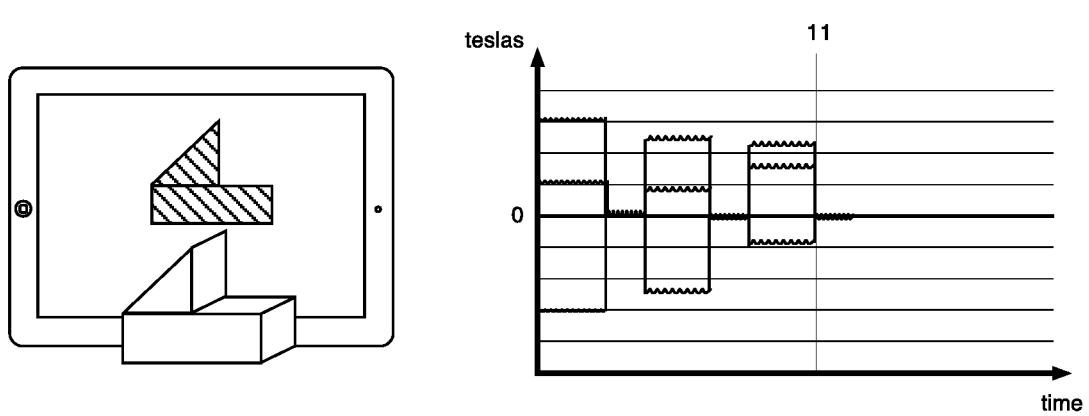

When the 3-axis magnetometer signal stabilizes for a given amount of time, the signal is compared to a table of stored x,y,z vectors. The object is recognized if the values are closed enough to a given table entry (FIG. 3e). If the object is recognized, the current magnetometer reading is stored and subsequent readings are subtracted from the stored magnetometer readings, resulting in a zero signal.

In an alternative embodiment, the recognition of a particular spatial arrangement of a group of objects is performed by identifying subgroups of objects having a particular spatial arrangement of objects placed near the device in a sequential manner as they are placed in predetermined locations relative to the electronic device.

Known to the skilled person, the detection of a specific magnetic field may be carried out by the detection of a specific direction and intensity of the 3-d vector detected by the compass, by a specific combination of each of the 3 axis orthogonal sensors of the compass, or any vector combination of these.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The term "comprising" whenever used in this document is intended to indicate the presence of stated features, integers, steps, components, but not to preclude the presence or addition of one or more other features, integers, steps, components or groups thereof.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A method for operating an electronic device having a display and a compass sensor for interacting with a set of objects, each of the objects incorporating a magnet, said method comprising:
obtaining an initial reading of a compass sensor signal by the compass sensor;
obtaining a current reading of the compass sensor signal once the compass sensor signal stabilizes;
deducting from the obtained current reading of the compass sensor signal the initial reading of the compass sensor signal to obtain a difference; and determining if the difference obtained in the deducting step matches one of a plurality of predetermined compass sensor signals corresponding to respective combinations of two or more of said objects in specific spatial arrangements relative to the electronic device, and in case of a match, triggering an action comprising emitting a sound or displaying an image, animation or film according to a combination of two or more of said objects in a specific spatial arrangement relative to the electronic device associated with the matched predetermined compass sensor signal,
wherein the magnet of each object is incorporated in a specific position and in a specific orientation such that each said predetermined compass sensor signal uniquely identifies a predetermined combination and spatial arrangement of the two or more objects of said predetermined combinations of the two or more of said objects in specific spatial arrangements; determining if the deducted compass sensor signal obtained in the deducting step matches sequentially one of a plurality of different predetermined compass sensor signals, each said different predetermined compass sensor signal corresponding to the predetermined combination and spatial arrangement of the two or more said objects relative to the electronic device.

2. The method according to claim 1, further comprising repeating the obtaining the current reading, the deducting and the determining until said match is obtained.

3. The method according to any claim 1, wherein any said spatial arrangement relative to the electronic device of said objects is such that each object is resting on or against the display of said electronic device.

4. The method according to claim 1, further comprising:
determining if the deducted compass sensor signal obtained in the deducting step matches sequentially one of a plurality of different predetermined compass sensor signals in a predetermined sequence of predetermined compass sensor signals,
each said different predetermined compass sensor signal corresponding to the predetermined combination and spatial arrangement of the two or more said objects relative to the electronic device.

5. The method according to claim 1, wherein said method is only initiated after detecting an initial action by a user of the electronic device.

6. The method according to claim 1, further comprising providing a tablet stand configured to hold the display of the electronic device at an angle relative to horizontal.

7. The method according to claim 6, wherein the tablet stand further comprises a shelf.

8. The method according to claim 6, wherein providing the tablet stand comprises providing the tablet stand further configured to hold the display of the electronic device at an angle relative to vertical.

9. A non-transitory storage media including program instructions for implementing a method for operating an electronic device having a display and a compass sensor for interacting with a set of objects, each of the objects incorporating a magnet in a specific position and in a specific orientation, the program instructions being executable to:
obtain an initial reading of the compass sensor signal;
obtain a current reading of the compass sensor signal once the compass sensor signal stabilizes;
deduct from the obtained current reading of the compass sensor signal the initial reading of the compass sensor signal to obtain a difference; and
determine if the difference matches one of a plurality of predetermined compass sensor signals corresponding to respective combinations of two or more of said objects in specific spatial arrangements relative to the electronic device, and, in case of a match, the instructions are further configured to execute to trigger an action comprising emitting a sound or displaying an image, animation or film according to a combination of two or more of said objects in a specific spatial arrangement relative to the electronic device associated with the matched predetermined compass sensor signal,
wherein each said predetermined compass sensor signal uniquely identifies a predetermined combination and spatial arrangement of the two or more objects of said predetermined combinations of the two or more of said objects in specific spatial arrangements,
determining if the deducted compass sensor signal obtained in the deducting step matches sequentially one of a plurality of different predetermined compass sensor signals,
each said different predetermined compass sensor signal corresponding to the predetermined combination and spatial arrangement of the two or more said objects relative to the electronic device.

* * * * *